US006748511B2

United States Patent
Nichols

(10) Patent No.: US 6,748,511 B2
(45) Date of Patent: Jun. 8, 2004

(54) RESIZING A PROTECTED AREA ON A HARD DISK

(75) Inventor: Anthony Lynn Nichols, Erie, CO (US)

(73) Assignee: Phoenix Technologies Ltd., Milpitas, CA (US)

( * ) Notice: Subject to any disclaimer, the term of this patent is extended or adjusted under 35 U.S.C. 154(b) by 0 days.

(21) Appl. No.: 09/801,122

(22) Filed: Mar. 6, 2001

(65) Prior Publication Data

US 2002/0129217 A1 Sep. 12, 2002

(51) Int. Cl.[7] .......................... G06F 12/14; G06F 12/16
(52) U.S. Cl. ..................... 711/173; 711/111; 711/112; 711/171; 711/172; 711/173; 711/152
(58) Field of Search ..................... 711/4, 111, 112, 711/170–173, 152

(56) References Cited

U.S. PATENT DOCUMENTS

| | | | | |
|---|---|---|---|---|
| 5,247,633 A | * | 9/1993 | Nissimov et al. | 711/4 |
| 5,339,319 A | * | 8/1994 | Yamane et al. | 360/47 |
| 5,375,243 A | * | 12/1994 | Parzych et al. | 380/52 |
| 5,966,732 A | * | 10/1999 | Assaf | 710/5 |

* cited by examiner

*Primary Examiner*—T. Nguyen

(57) ABSTRACT

A computer having storage apparatus with protected and drive data areas and with an operating system stored in the storage apparatus. The computer is controlled to select a hard drive of the storage apparatus and determine if the selected hard drive has a protected area for storing diagnostic programs and data in combination with a drive data area for storing user information. The computer has operating apparatus for adjusting sizes of the selected hard drive protected and drive data areas in accordance with requirements of a user of the computer and for reallocating storage of data in the adjusted data areas.

30 Claims, 6 Drawing Sheets

RESIZING A PROTECTED AREA ON A HARD DISK

BACKGROUND OF THE INVENTION

This invention relates to a computer hard drive and in particular to the resizing of protected and drive data storage areas of a personal computer system hard drive and the re-apportioning of data stored on the resized hard drive.

FIELD OF THE INVENTION

Personal computers generally have a micro-processor, monitor, keyboard, floppy disk drive, hard drive, memory and communication ports. In general, the micro-processor, or central processor unit, is connected by bus structures with the memory and with input/output devices interconnecting the bus structures with the monitor, keyboard, communication ports, and the floppy and hard drives. Typically, software known as operating systems, such as a disk operating system (DOS) and Windows® systems and the like, that have been loaded onto the personal computer hard drive and read into the memory, enable the components of the personal computer to work together to process data. Under control of an operating system, the keyboard or communication port may be used to enter data into the central processor unit. The central processor unit may process the data and store the processed data in memory, on a disk inserted into the floppy disk drive or on the hard drive. In general, the keyboard entered and processed data may be displayed on the monitor or sent to the communication ports to be printed or sent to a modem for transmission to external networks and devices connected to the personal computer.

Typically, a manufacturer or user of the personal computer loads and stores operating systems onto the computer hard drive that functions to interconnect the various components of the personal computer together to enable the computer user to enter data into the computer, compile the entered data, display the data, transmit the data to distant entities and store the data on floppy disks and on the computer hard drive. The computer user may load and store software programs such as word processors, spreadsheets, and various other types of software programs on the computer hard drive that enable the computer user to execute a wide variety of activities. The data complied by the software programs is often entered and stored on the computer hard drive as user information.

Typically, computer hard drives store the user information or data on multiple magnetic disks mounted on a spindle that is rotated in the hard drive. As the disks are rotated in the drive by the spindle, data is read from or written onto the disks by means of read/write head assembles carried on arms extending over the surfaces of the magnetic disks. The head assembles are positioned by a motor assembly under the control of a disk controller controlled by commands from the computer central processor unit. Today's typical computer hard drives have multiple magnetic disks with a read/write head positioned on each side of the disk surface and all under control of the same motor assembly. Each side of the magnetic disks is typically divided into a series of concentric rings referenced as a cylinder extending down through the disks. The set of rings on all sides of all disks lying on the same imaginary cylinder extending down through the disks have the same cylinder identification. Each cylinder is logically divided by a computer operating system into sectors which can be numbered with respect to some reference mark on the magnetic disk. Each sector of a disk has a unique identification, such as a cylinder number, disk side and sector number. Alternatively, a single sector number can uniquely identify a particular sector in a system where sectors are numbered in a serpentine manner, beginning with the outermost cylinder on an upper side and continuing through the sectors on the same cylinder to the lower disk side. This configuration is continued on the same cylinder of the next disk and repeated for the next inward cylinder and so on until all sectors have been numbered. Typical computer operating systems designate the space on the disk in a strategy referred to as a partition with the details of the partitioning being recorded on a disk in the form of a "partition table".

In general, a computer is divided by manufacturers of the hard drive into two sections, one of which is herein identified as a protected area and the other as a drive data area such that the total size of the hard drive is the combination of the protected and drive data areas. Thus, if the protected area of the disk is increased by 10 million bytes the drive data area would decrease by 10 million bytes. In general, the drive data area consists of general structures such as boot records, partition tables, file allocation tables and user information and data. A computer operating system stored on the computer hard drive has parts located in each of the general structures and commonly exists only in the drive data area. The protected area is normally considered to consist of data and the boot engineering extension record (BOOT).

The drive data area must be connected throughout in a contiguous unbroken sequence and generally begins with the lowest numbered sectors of the hard drive. The protected area must also be contiguous and generally resides at the end of the hard drive in the highest numbered sectors of the hard drive. The protected area is determined by the hard drive manufacturer and cannot be created or changed by the end user of the personal computer. However, the data in the protected area may be accessed by the end user through mechanisms such as the BIOS, hotkeys and the like, provided by the manufacturers of the hard drive and personal computer.

In general, hard drive manufactures do not want to significantly reduce the size of the drive data area available to the end user and typically want to keep the size of the protected area small in the range of 200 megabytes to 2 gigabytes. In general, only small operating systems such as DOS are placed in the protected area. A manufacturer may desire to provide free Windows-based programs in the protected area for use by the user who is able to copy the free programs into the drive data area available for the use of the end user. Providing these programs in the protected area saves the manufacture from having to provide the end user with a floppy or CD disk. The manufacturer may want to provide means for resizing the storage areas of the hard drive to make the protected area larger to store additional programs therein and once the programs have been copied out of the protected area, to make the protected area smaller so that the size of the drive data area can be increased for additional use by the end user.

A problem arises in the prior art that the sizes of the protected and drive data areas of the present day hard drives are fixed and there is no mechanism available to resize the protected and drive data areas once operating systems have been installed on the hard dive. Thus, it is desirable that that protected and drive data areas of hard drives be resized to enlarge the storage area in a protected area for software programs that can be made available to end users and to decrease the protected area and enlarge the drive data area after programs of the protected area have been copied into the drive data area.

SUMMARY OF THE INVENTION

It is an object of the invention to enable a computer system having an operating system installed on a hard drive to adjust the sizes of protected and drive data storage areas of the hard drive.

It is also an object of the invention to read the sizes of the protected and drive data areas of personal computer hard drives.

It is also an object of the invention to read boot engineering extension records stored in the protected area of a personal computer hard drive and to check the records for previously recorded structures stored in the protected area.

It is also an object of the invention to calculate sizes of new protected and drive data areas of a personal computer hard drive in accordance with the computer user requirements.

It is a further object of the invention to reorganize and reallocate the data previously stored in protected and drive data areas of a personal computer hard drive into the new calculated protected and drive data areas and to change the data entries of the new sized partition size, file allocation table and boot engineering extension record.

In a preferred embodiment of the invention, a computer in accordance with principles of the invention and having data storage apparatus with an operating system stored therein has software controlled selecting apparatus for selecting a hard drive of the storage apparatus and determining if the selected hard drive has a protected data area for storing protected data and a drive data area for storing user data. When it is determined that the computer has protected and drive data areas, the computer calculates sizes of new protected and drive data areas in accordance with requirements of the computer user and resets the sizes of the selected hard drive protected and drive data areas to the calculated new protected and drive data area sizes. The computer is then controlled to reallocate, move and update user data stored in the calculated new protected data area to the calculated new drive data area of the selected hard drive and updates data location tables within the new calculated drive data area. The computer is then rebooted to establish the new protected and user data areas on the selected hard drive.

Also in accordance with the preferred embodiment of the invention, a method for resizing data areas of storage apparatus of a computer having operating system information stored therein comprises the step of selecting a hard drive of the computer storage apparatus and determining if the selected hard drive has a protected data area for storing protected data and a drive data area for storing data of the computer user. The method calculates sizes of new protected and drive data areas in accordance with requirements of the computer user and resets the sizes of the selected hard drive data areas to the calculated new protected and drive data areas. The user data stored in the calculated new protected data area is reallocated, updated and moved to the calculated new drive data area of the selected hard drive and the data location tables within the calculated new drive data area of the selected hard drive are updated. The computer is then rebooted to establish the new protected and drive data areas on the selected hard drive.

In a further embodiment of the invention, a storage medium, such as floppy disks, a tape or CD-ROM, for enabling operation of a personal computer to resize data areas of storage apparatus having operating system information stored therein has a method stored therein for selecting a hard drive of the computer storage apparatus and determining if the selected hard drive has a protected data area for storing protected data and a drive data area for storing data of the computer user. The stored method calculates sizes of new protected and drive data areas in accordance with requirements of the computer user and resets the sizes of the hard drive data storage areas to the calculated new protected and drive data areas. User data stored in the calculated new protected data area is reallocated, updated and moved to the calculated new drive data area of the selected hard drive and data location tables of the hard drive are updated to conform to the new calculated protected and drive data areas. The computer is then rebooted to establish the new protected and drive data areas on the selected hard drive.

BRIEF DESCRIPTION OF THE DRAWINGS

For a further understanding of the objects and advantages of the present invention, reference should be had to the following detailed description, taken in conjunction with the accompanying drawing figures, in which like parts are given like reference numerals and wherein.

The detailed operation of the component parts of a personal computer are well known in the art and the details of which need not be disclosed for an understanding of the invention. A typical description of computer operation may be found in the text "How Computers Work" by Ron White, published by QUE®. a division of Macmillian Computer Publishing, USA, Indianapolis, Ind., Millennium Edition, September 1999, which is specifically incorporated herein by reference.

DETAILED DESCRIPTION OF THE INVENTION

Figure 1:
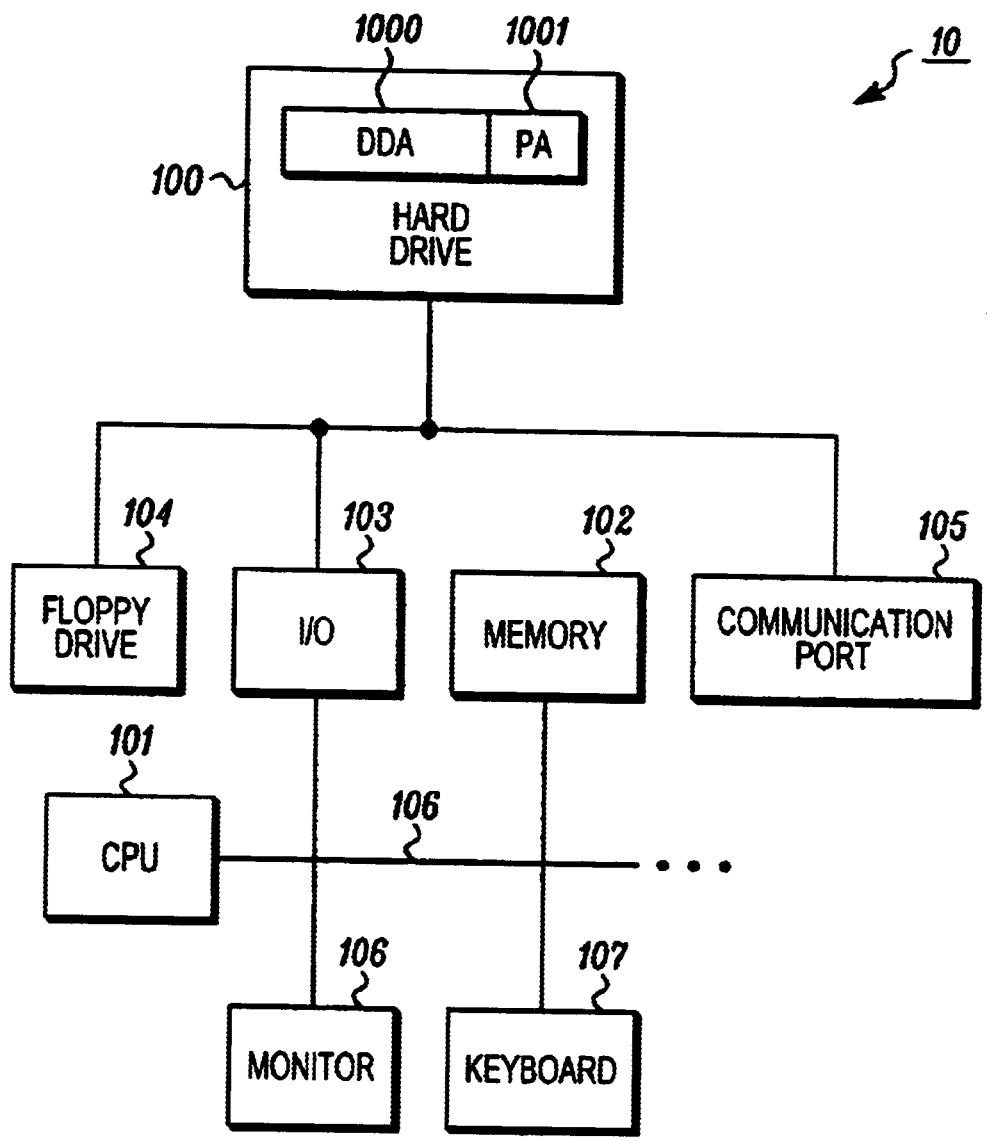
FIG. 1 is a block diagram of a personal computer embodying the principles of the invention.

With particular reference to FIG. 1, there is shown a personal computer generally indicated by the number 10. Personal computers, hereinafter referred to as computer 10, have had a phenomenal growth in the last few years in many types of applications. Typically, but not necessarily limited thereto, a computer such as computer 10 may have a single or multiple central processing units 101 that perform the operations of computer 10. The central processing unit 101 may be coupled by a transmission bus 106 with memory units such as memory unit 102, so that software programs may be read into memory unit 102 from storage apparatus such as floppy disk drive 104 and hard drive 100 via input/output device 103 and executed by operation of central processing unit 101. Transmission bus 106 may also connect central processing unit 101 to other units such as monitor 106 and keyboard 107 so that user data may be entered into the system by keyboard 107 and displayed on monitor 106.

User information may be read into and from personal computer 10 by communication port 105 via input/output device 103 and transmission bus 106 connected with central processing unit 101.

Typically, software in the form of programs are loaded into computer 10 from floppy disks inserted into floppy drive 104, from CD-ROM disks inserted into a CD-ROM drive (not shown). The software programs are generally recorded and stored in hard drive 100. Computer 10 may have a single hard drive 100 or may have storage apparatus having a number of hard drives 100 or other types of storage units. A hard drive, such as hard drive 100, may have a protected area 1001 that may be used to store small programs such as DOS, diagnostic tools, DOS-based utilities and other small programs in combination with a drive data area 1000 that is used to store programs loaded into computer 10 by an end user and information generated by the end user.

Figure 3:
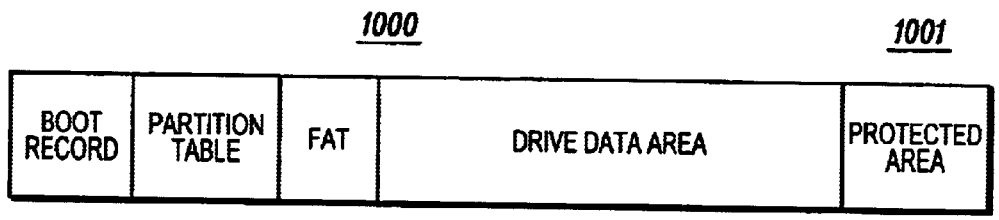
FIG. 3 is a representation of a data storage arrangement showing protected and drive data areas of the hard drive set forth in FIG. 2, FIG. 4 sets forth a data storage arrangement showing a resizing of the protected and drive data areas set forth in FIG. 3, and FIGS. 5, 6 and 7 set forth a flow diagram of the operation of the invention in resizing of protected and drive data areas of the hard drive set forth in FIG. 2.
Figure 4:
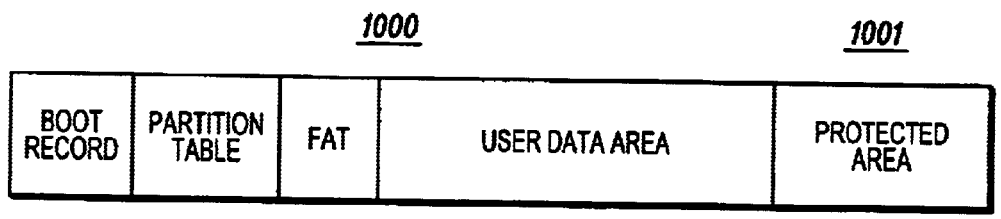

The hard drive protected area 1001 cannot be created or changed by the computer end user but the data stored in protected area 1001 may be accessed by the computer end user through mechanisms, such as BIOS, hotkeys and the like, provided by either the hard drive or personal computer manufacturer who installs hard drive 100 in computer 10. In general, the manufacturers prefer to keep the size of the protected area 1001 small, typically in a range of 200 MB to 2 GB so as to make the drive data area 1000 as large as possible. Some Windows® based programs may be placed in the protected area 1001 but cannot be executed while within the protected area 1001. The manufacturers may want to provide Windows-based "free" programs to the end user in the protected area with the exception that the end user, if they desire to use the programs, will copy the programs from the protected area 1001 into their drive data area 1000. The present embodiment of the invention provides a mechanism so that the protected area 1001 can be enlarged, FIG. 4, to provide additional storage for end user programs or diagnostics or may be decreased, FIG. 3, to increase the size of the drive data area 1000 after the resident programs in the protected area 1001 have previously been copied into the user drive data area 1000.

Figure 2:
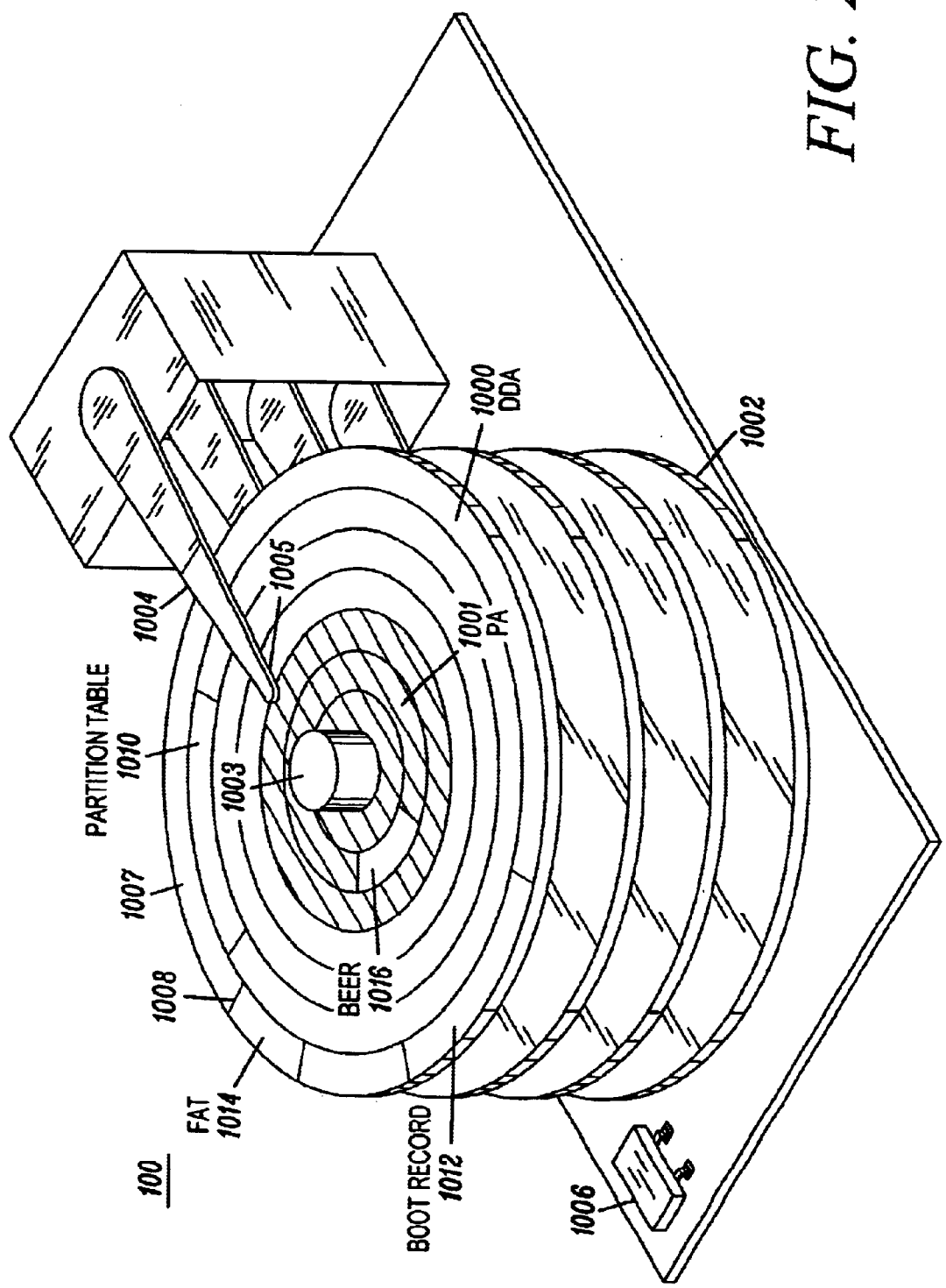
FIG. 2 is a representation of a computer hard drive of the personal computer set forth in FIG. 1 having protected and drive data areas for storing data.

As shown in FIG. 2 the computer hard drive 100 of personal computer 10, has multiple magnetic disks 1002 mounted on a spindle 1003 of the drive. As the disks 1002 are rotated in the drive, data is read from or written onto the disks by means of a read/write head assembly 1005 carried on an arm 1004 extending over the surface of a magnetic disk 1002. The head assembly 1005 is positioned by a motor assembly under the control of a disk controller 1006 controlled by commands from the computer central processor unit 101. Each side of the magnetic disks 1002 are divided into a series of concentric rings 1007 referenced as a cylinder extending down through the disks 1002. The cylinders are logically divided by the computer operating system into sectors which are numbered with respect to a reference mark on the magnetic disk 1002. Each sector of a disk has a unique identification, such as a cylinder number, disk side and sector number. Alternatively, a single sector number can uniquely identify a particular sector in a system where sectors are numbered in a serpentine manner, beginning with the outermost cylinder on an upper side and continuing through the sectors on the same cylinder to the lower disk side. This configuration is continued on the same cylinder of the next disk and repeated for the next inward cylinder and so on until all sectors have been numbered. Typical computer operating systems designate the space on the disk in a strategy referred to as a partition with the details of the partitioning being recorded on a disk in the form of a "partition table".

The operating system is perhaps the most important piece of software or program that is stored in computer 10. An operating system commonly exists only in the drive data area and has parts in the general structures such as the boot records, the partition tables, file allocation table (FAT) along with user data which is also located in the drive data area. The protected area generally has the boot engineering extension record (BOOT) and data such as diagnostic programs.

In starting the resizing operation, the apparatus of computer 10 FIG. 1 in response to the program controlling central processor unit 101 selects either hard drive 100 or a hard drive such as hard drive 100 from the storage apparatus of computer 10 and determines if the selected hard drive 100 has a protected area 1001 for storing diagnostic programs and data in combination with a drive data area 1000 for storing user information. Computer 10 accesses the selected hard drive 100 and reads the identity of the hard drive 100 and determines if the hard drive 100 supports a protected area 1001. If the selected hard supports a protected area 1001, central processing unit 101 issues a read native max command, described by an ATA 5 standard, to the disk controller 1006, FIG. 2, of the selected hard drive 100 to read the sizes of the protected area 1001 and drive data area 1000. Commands, such as the read native max command, are sent to the hard drive 100 through a low-level interface such as a DOS program. The central processing unit 101, FIG. 1, is then setup by the resizing program to issue a set native max command, described by the ATA 5 standard, to control disk controller 1006 to read the entire protected area 1001 and drive date area 1000.

Boot engineering extension records, FIG. 2, (specification T13 D1 367) are stored in the protected area 1001. Central processing unit 101 reads the boot engineering extension records of the hard drive 100 protected area 1001 and checks the records thereof for recorded structures previously stored in the protected area 1001. A start location of protected area 1001 is determined from the read boot engineering extension records and a last sector of the selected hard drive is checked for structures stored in the hard drive protected area 1001. Central processor unit 101, FIG. 1, in operating in accordance with the resizing program, adjusts sizes of the selected hard drive 100, FIGS. 3 and 4, protected area 1001 and drive data area 1000 in accordance with requirements of a user of the computer and reallocates storage of data in the adjusted drive data area.

Computer 10, operating in resizing the data storage areas of hard drive 100, calculates sizes of a new protected area 1001 and a new drive date area 1000 in accordance with computer user requirements. Following the calculation of the new protected and drive data areas, central processor unit 101 determines if the computer operating system has data stored in the calculated new protected area of the selected hard drive. New sizes are computed, FIG. 2, for the partition table, file allocation table and boot engineering extension records and user data and information stored in the calculated new protected area is moved to the calculated new drive data area of the selected hard drive 100. The file allocation table chain of hard drive 100 is then updated and the file directory entry file allocation table pointer is revised to indicate the updated file allocation table chain. Central processor unit 101 revises entries for the new sized partition table, file allocation table and boot engineering extension record, changes data entries of the selected hard drive protected area 1001 to conform to the calculated protected area and modifies the drive data area 1000 to the calculated drive data area using the set native max command. The resizing program is completed by rebooting computer 10 to initiate operation of the resized hard drive 100.

Figure 5:
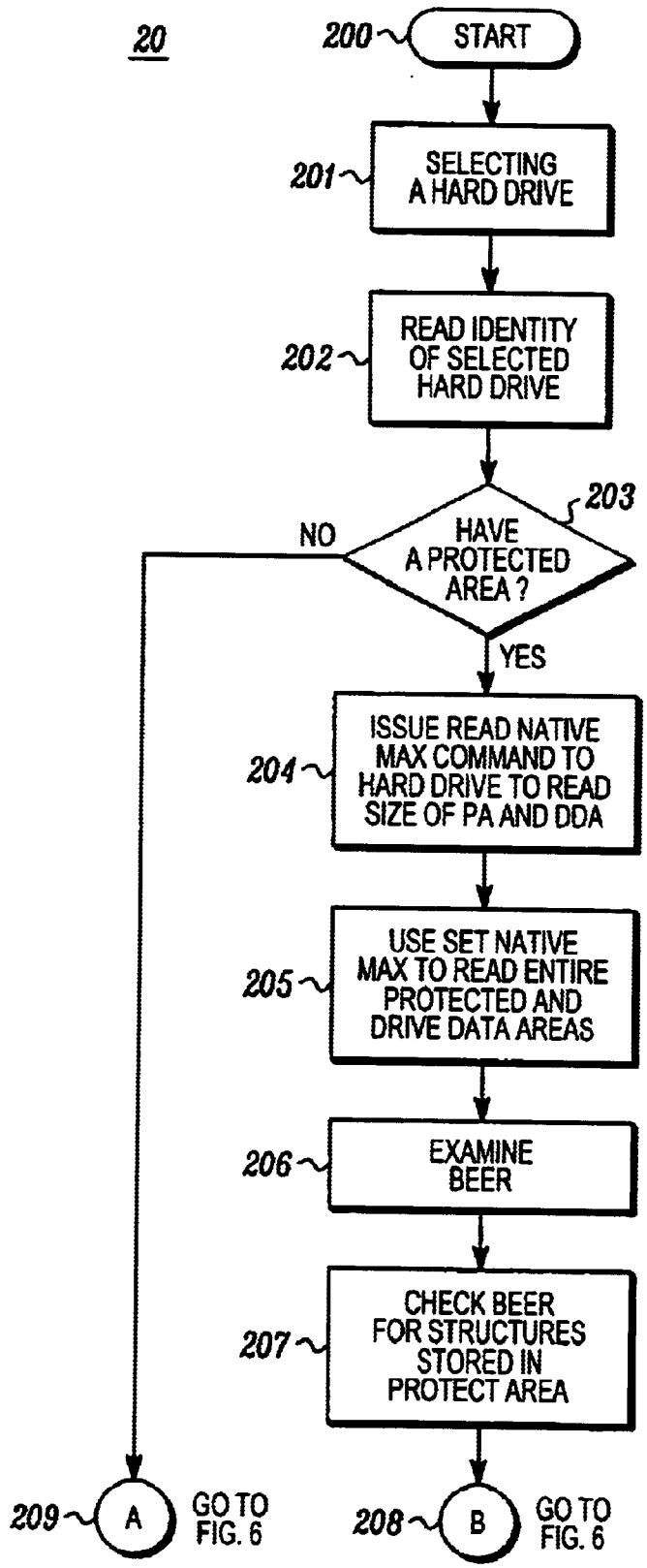
Figure 6:
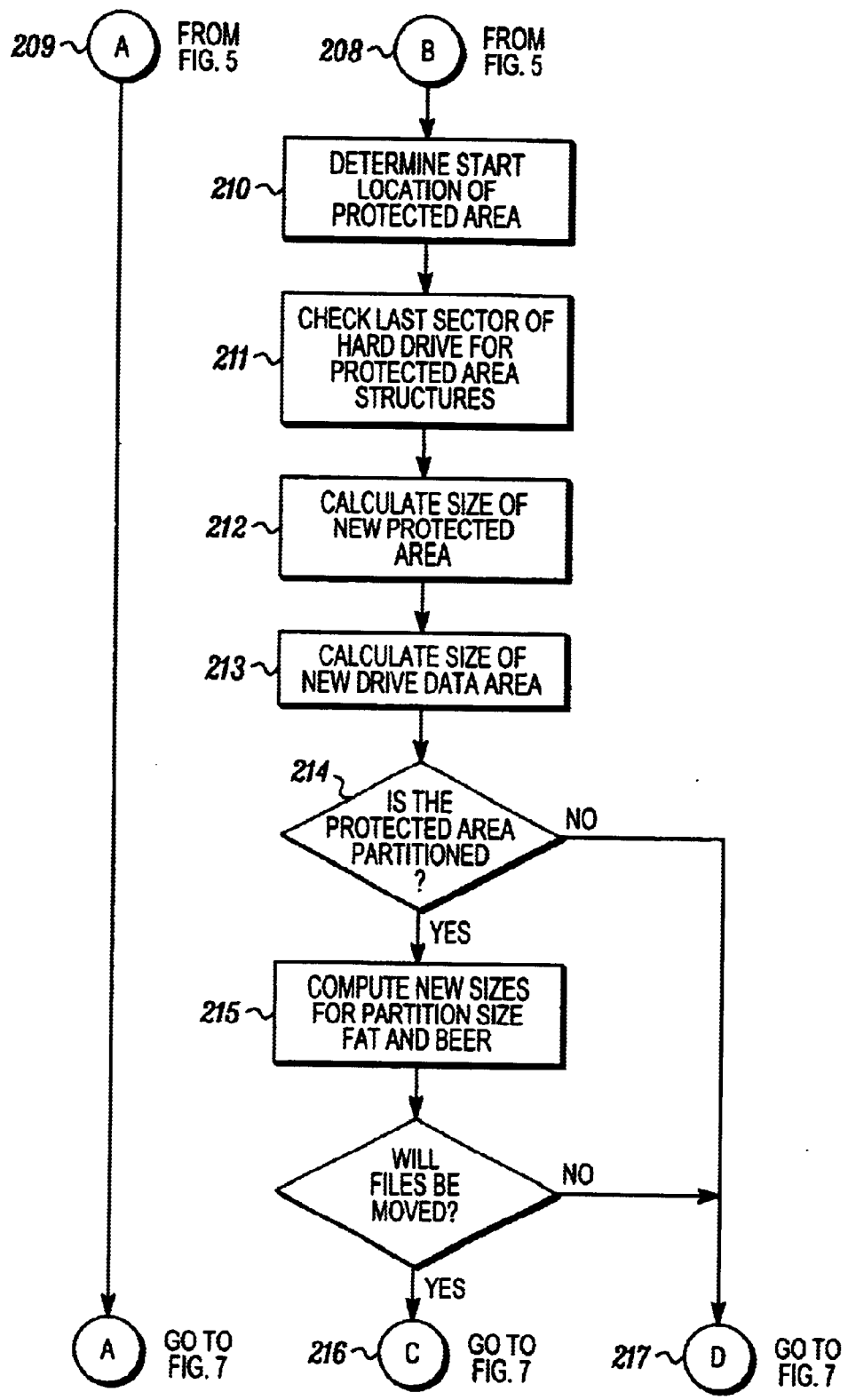
Figure 7:
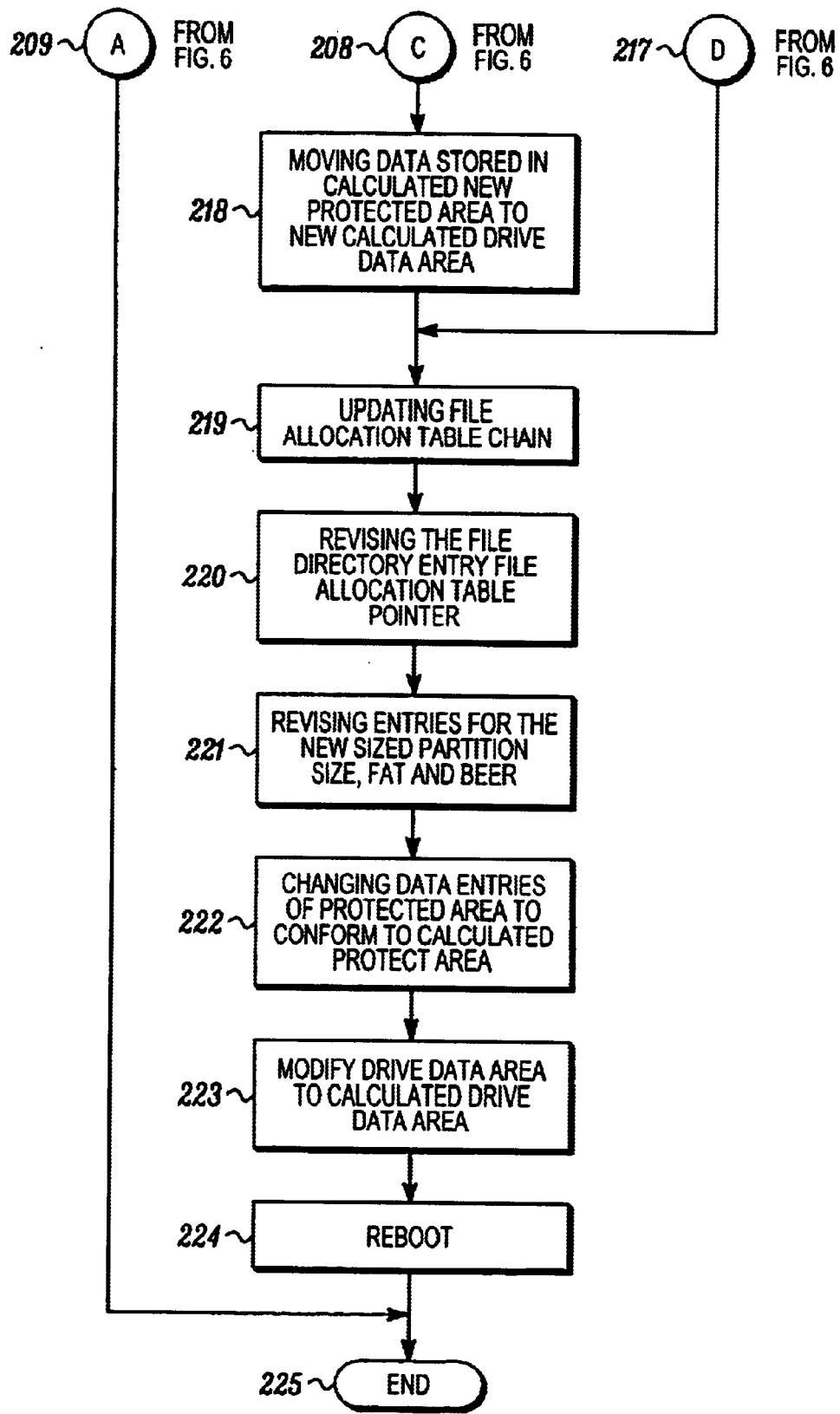

The method 20 of operating computer 10, FIG. 5, to resize the data areas of the computer storage apparatus having operating system information stored therein starts, step 200, by controlling the central processor 101 to select a computer hard drive of the storage apparatus and determine if the selected hard drive has a protected area 1001 for storing diagnostic programs and data in combination with a drive data area 1000 for storing information of a user of the computer. The sizes of the selected hard drive protected and drive data areas are adjusted in accordance with requirements of the computer user and the data stored in the original protected area 1001 and drive data area 1000 are reallocated into the resized protected and drive data areas, FIGS. 3 and 4. The method 20, FIG. 5, selects the hard drive 100 of computer 10 or a hard drive 100 from the computer storage apparatus, step 201, and reads an identity of the selected hard drive 100 and determines if the identified hard drive 100 supports a protected area 1001, steps 202 and 203. If the selected hard drive does not support a protected area 1001, step 203, the method ends, FIG. 7, step 225.

When it is determined that the identified hard drive 100 has a protected area 1001, step 203, a read native max command is issued to the hard drive 100 to read the size of the protected area 1001 and the drive data area 1000, step 204. A set native max command is issued, step 205, to read the entire protected area 1001 and drive date area 1000. The method 20 then examines the boot engineering extension records stored on the selected hard drive protected area 1001, step 206, and checks records thereof for previously recorded structures stored in the protected area 1001, step 207. The start location of the protected area 1001 is determined from the examined boot engineering extension record, step 210, and a last sector of the selected hard drive is checked, step 211, for structures stored in the selected hard drive protected area 1001.

Method 20 adjusts sizes of the selected hard drive protected area 1001 and drive data area 1000 in accordance with requirements of the computer user and reallocates data stored in the original protected and drive data areas into the resized protected and drive data areas. In the adjusting sequence, method 20 calculates sizes of a new protected area 1001 and a new drive data area 1000 in accordance with the computer user requirements, steps 212 and 213. If the operating system, step 214, does not have data or there is no user data stored in the newly calculated protected area, method 20 advances to step 219, FIG. 7. When there is operating system and user data located in the new protected area 1001, new sizes are computed for the hard drive partition table, file allocation table and boot engineering extension records, step 215. The data stored in the calculated new protected area 1001 is moved to the calculated new drive data area 1000 of the selected hard drive and the file allocation table chain is updated of the selected hard drive 100, steps 218 and 219. In addition, the file directory entry file allocation table pointer is revised to indicate the updated file allocation table chain, step 220, and entries are revised for the new sized partition table, file allocation table and boot engineering extension records, step 221. The adjusting sequence also changes data entries of the selected hard drive protected area 1001 to conform to the calculated protected area, step 222, and issues the set native max command to modify the drive data area 1000 to the calculated drive data area 1000, steps 223. The computer 10 is then rebooted, step 224, to complete and end the resizing operation, step 225.

The steps of method 20, FIG. 5, may be stored on a storage medium such as a CD ROM disk, floppy disks, tapes or recorded on the computer storage apparatus and entered into computer 10 so that computer 10, operating in accordance with the computer operating system, can be controlled to select a hard drive 100 of the storage apparatus and determine if the selected hard drive 100 has a protected area 1001 for storing diagnostic programs and data in combination with a drive data area 1000 for storing the operating system and information of a user of the computer. Upon determining the existence of a protected area 1001 in combination with a drive data area 1000, computer 10 is controlled to adjust the selected hard drive protected and drive data areas in accordance with requirements of the computer user and to reallocate the storage of data in the adjusted protected and drive data areas.

It is obvious from the foregoing that the facility, economy and efficiently of operation of personal computers is improved by apparatus for resizing the protected and drive data areas of data storage apparatus such as a hard drive of the personal computer operating under control of an operating system stored on the hard drive. While the foregoing detailed description has described an embodiment of apparatus and a method for resizing a computer storage apparatus such as a hard drive, it is to be understood that the above description is illustrative only and is not limiting of the disclosed invention. Particularly other configurations of storage apparatus are within the scope and spirit of this invention. Thus, the invention is to be limited only by the claims set forth below.

What is claimed is:

1. A computer having storage apparatus with an operating system stored therein wherein the computer comprises:

selecting apparatus for selecting a hard drive of the storage apparatus and determining if the selected hard drive has a protected area for storing diagnostic programs and data in combination with a drive data area for storing user information;

operating means for adjusting sizes of the selected hard drive protected and drive data areas in accordance with user requirements and reallocating storage of data in the adjusted drive data areas, said operating means further comprises calculating means for calculating a size of a new protected area and new drive data in accordance with user requirements and means for determining if the operating system has data stored in a calculated new protected area of the hard drive;

means for reading an identity of the hard drive from the hard drive and determining if the hard drive supports the protected area in combination with the drive data area;

means for issuing a read native max command to the hard drive to read the size of the protected and drive data areas of the hard drive;

setup means for allocating said protected and drive data areas of the hard drive by issuing a set native max command to the hard drive;

reading means for reading boot engineering extension records stored in the protected area of the hard drive and checking the records for previously recorded structures stored in the protected area; and determining means for determining a start location of the protected area of the hard drive from the read boot engineering extension records.

2. The computer set forth in claim 1 wherein the operating means comprises:

means for moving data stored in the calculated new protected area to the calculated new drive data area of the hard drive.

3. The computer set forth in claim 1 wherein the operating means comprises:
means for updating the file allocation table chain of the hard drive.

4. The computer set forth in claim 3 wherein the operating means comprises:
means for revising the file directory entry file allocation table pointer to indicate the updated file allocation table chain.

5. The computer set forth in claim 1 wherein the boot engineering extension records reading means comprises:
means for checking a last sector of the hard drive for structures stored in the protected area.

6. The computer set forth in claim 1 wherein the operating means comprises:
means for computing new sizes required for partition table, file allocation table and boot engineering extension records.

7. The computer set forth in claim 6 wherein the operating means comprises:
means for revising entries for the new sized partition table, file allocation table and boot engineering extension records.

8. The computer set forth in claim 7 wherein the operating means comprises:
means for changing data entries of the selected hard drive protected area to conform to the calculated protected area.

9. The computer set forth in claim 8 wherein the operating means comprises:
means for modifying the drive data area to the calculated drive data area using the set native max command.

10. The computer set forth in claim 9 wherein the operating means comprises:
means for rebooting the computer.

11. A computer having a hard drive with an operating system stored therein wherein the computer comprises:
selecting means for selecting the hard drive and determining if the hard drive has a protected area for storing protected data in combination with a drive data area for storing user data;
calculating means for calculating sizes of a calculated new protected area and a calculated new drive data area in accordance with user requirements and for resetting sizes of the protected area and drive data area to the calculated new protected area and the calculated new drive data area;
moving and updating means for moving user data stored in the calculated new protected area to the calculated new drive data area of the hard drive and for updating data location tables within the calculated new drive data area of the hard drive; and
rebooting means for rebooting the computer to establish the calculated new protected area on the hard drive.

12. A computer having storage apparatus with an operating system stored therein wherein the computer comprises:
means for reading an identity of a hard drive of the storage apparatus and determining if the hard drive supports a protected area in combination with a drive data area;
means for issuing a read native max command to the hard drive to read a size of the protected area and drive data area;
setup means for modifying the protected area and drive data area of the hard drive by issuing a set native max command to the hard drive;
reading means for reading boot engineering extension records stored in the protected area on the hard drive and for checking the records of structures previously stored in the protected area;
determining means for determining a start location of the protected area on the identified hard drive from the read boot engineering extension records;
calculating means for calculating a size of a new protected area in accordance with computer user requirements;
calculating means for calculating a size of a new drive data area in accordance with the computer user requirements;
means for determining if the operating system has data stored in the calculated new protected area of the hard drive;
means for moving the data stored in the calculated new protected area to the calculated new drive data area of the hard drive;
means for updating the file allocation table chain of the hard drive;
means for revising the file directory entry file allocation table pointer to indicate the updated file allocation table chain;
means for computing new sizes required for partition table, file allocation table and boot engineering extension records;
means for revising entries for the new sized partition table, file allocation table, and boot engineering extension records;
means for changing data entries of the protected area to conform to the calculated new protected area;
means for modifying the drive data area to the calculated new drive data area using the set native max command; and
means for rebooting the computer.

13. A method for resizing data areas of a storage apparatus of a computer having operating system information stored therein comprising:
selecting a hard drive of the storage apparatus and determining if the hard drive has a protected area for storing diagnostic programs and data in combination with a drive data area for storing user information;
reading an identity of the hard drive and determining if the hard drive supports said protected area in combination with said drive data area;
issuing a read native max command to the hard drive to read a size of the protected area and a size of the drive data area of the hard drive;
modifying the protected area and drive data area of the hard drive using a set native max command;
examining boot engineering extension records stored on the protected area and checking records thereof for structures previously stored in the protected area;
determining a start location of the protected area on the hard drive from the examined boot engineering extension record;
checking a last sector of the hard drive for structures stored in the protected area;
calculating a size of a calculated new protected area in accordance with user requirements;

computing a size of a calculated new drive data area in accordance with user requirements;

adjusting sizes of the protected area and drive data area in accordance with user requirements and reallocating data stored in the protected area and drive data area into a resized protected area and a resized drive data area; and determining if the operating system has data stored in the calculated new protected area of the hard drive.

14. The method of claim 13 wherein said adjusting comprises:

computing new sizes required for partition table, file allocation table and boot engineering extension records.

15. The method of claim 14 wherein said adjusting comprises:

moving data stored in the calculated protected area to the calculated new drive data area of the hard drive.

16. The method of claim 15 wherein said adjusting comprises:

updating the file allocation table chain of the hard drive.

17. The method of claim 16 wherein said adjusting comprises:

revising the file allocation table pointer to indicate the updated file allocation table chain.

18. The method of claim 17 wherein said adjusting step comprises:

revising entries for the new sized partition table, file allocation table and boot engineering extension records.

19. The method of claim 18 wherein said adjusting comprises:

changing data entries of the protected area to conform to the calculated new protected area.

20. The method of claim 19 wherein said adjusting comprises:

modifying the drive data area to the calculated new drive data area using the set native max command.

21. The method of claim 20 wherein said adjusting comprises:

rebooting the computer.

22. A method for resizing data areas of storage apparatus of a computer having operating system information stored therein comprising:

selecting a hard drive of the computer storage apparatus and determining if the hard drive has a protected data area for storing protected data and a drive data area for storing data of the computer user;

calculating sizes of a calculated new protected area and a calculated new drive data area in accordance with requirements of the computer user and resetting the sizes of the protected area and drive data area to the calculated new protected area and the drive data area;

moving and updating user data stored in the calculated new protected data area to the calculated new drive data area of the hard drive and updating data location tables within the calculated new drive data area of the hard drive; and rebooting the computer to establish the calculated new protected area and drive data area on the hard drive.

23. A storage medium for enabling operation of a computer to resize data areas of a storage apparatus having operating system information stored therein wherein the storage medium has a method stored therein comprising:

selecting a hard drive of the computer storage apparatus and determining if the hard drive has a protected data area for storing protected data and a drive data area for storing data of the computer user;

calculating sizes of a calculated new protected area and a calculated new drive data area in accordance with requirements of the computer user and resetting the sizes of the protected area and drive data area to the sizes of the calculated new protected area and calculated drive data area;

moving and updating user data stored in the calculated new protected data area to the calculated new drive data area of the hard drive and updating data location tables within the calculated new drive data area of the hard drive; and rebooting the computer to establish the calculated new protected area and calculated new drive data area on the hard drive.

24. A method for resizing a protected area on a hard disk of a computer comprising:

determining if the hard disk has a protected data area and a user data area;

establishing a new protected data area and a new user data area;

determining if there is data stored in the new protected data area that was previously stored in the user data area and, if so, moving said data to the new user data area.

25. The method of claim 24 further comprising rebooting said computer to establish said new protected data area and the new user data area.

26. The method of claim 24, wherein establishing the new protected data area and the new user data area further includes:

increasing a size of the protected data area by a user selected amount; and decreasing a size of the user data area by said user selected amount.

27. The method of claim 24, wherein establishing the new protected data area and the new user data area further includes:

decreasing a size of the protected data area by a user selected amount; and increasing a size of the user data area by said user selected amount.

28. The method of claim 27, further comprising:

determining if said new user data area contains protected data that was previously stored in the protected data area and, if so, moving said protected data to the new protected data area.

29. A computer having a hard drive with an operating stored therein, comprising:

selecting means for selecting the hard drive and determining if the hard drive has a protected area for storing protected data in combination with a drive data area for storing user data;

calculating means for calculating sizes of a calculated new protected area and a calculated new drive data area in accordance with user requirements, and for resetting sizes of the protected area and drive data area to the calculated new protected area and the calculated new drive data area; and moving and updating means for moving user data stored in the calculated new protected area to the calculated new drive data area of the hard drive and for updating data location tables within the calculated new drive data area of the hard drive.

30. A method for resizing data areas of a storage apparatus of a computer having operating system information stored therein, comprising:

selecting a hard drive of the computer storage apparatus and determining if the hard drive has a protected data area for storing protected data and a drive data area for storing computer user data;

calculating sizes of a calculated new protected area and a calculated new drive data area in accordance with computer user requirements, and resetting the sizes of the protected area and drive data area to the sizes of the calculated new protected area and calculated drive data area; and moving and updating user data stored in the calculated new protected data area to the calculated new drive data area of the hard drive and updating data location tables within the calculated new drive data area of the hard drive.

* * * * *